Oct. 5, 1926.

E. R. HONSINGER 1,602,024

DEVICE FOR ESTABLISHING AND MAINTAINING CIRCULATION OF AIR

Filed Nov. 10, 1925

Inventor
E. R. Honsinger,

By Clarence A. O'Brien
Attorney

Patented Oct. 5, 1926.

1,602,024

UNITED STATES PATENT OFFICE.

EMANUEL RICHMOND HONSINGER, OF LOS ANGELES, CALIFORNIA.

DEVICE FOR ESTABLISHING AND MAINTAINING CIRCULATION OF AIR.

Application filed November 10, 1925. Serial No. 68,178.

My invention pertains to means for putting air in motion for cooling purposes.

The object of my said invention is the provision of a device adapted to establish and to maintain the circulation of air to and from the device, as distinguished from the straight blast of air directed away from the well known electric fan, the air in accordance with my invention being drawn to my novel device by the creation of a partial vacuum in the device which tends to lower the temperature of the air, and the air being discharged from the device so as to carry it to a point remote from the device from whence it will be taken back to the device so that a cycle of air will be formed in an apartment or in an auditorium for the purpose of rendering the temperature therein cool and comfortable.

Other objects and practical advantages of the invention will be fully understood from the following description and claims when the same are read in connection with the drawings, accompanying and forming part of this specification, in which:—

Similar numerals of reference designate corresponding parts in all of the views of the drawings.

Figure 1:
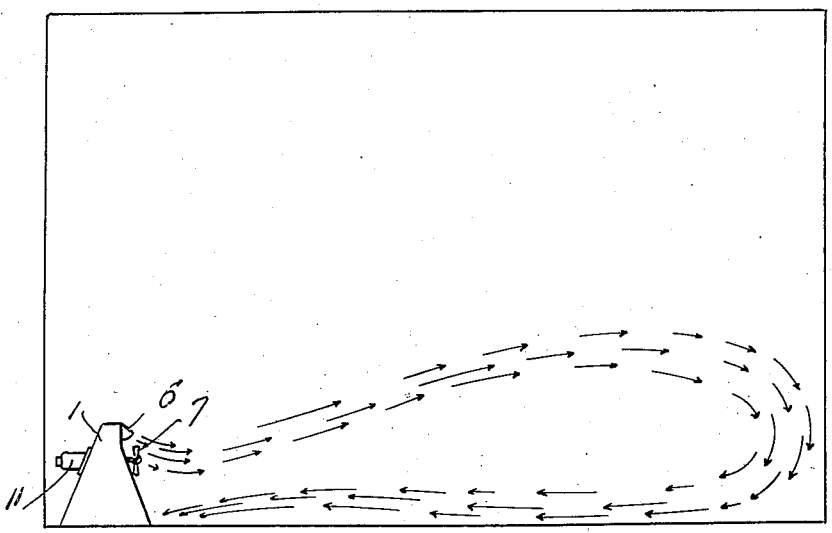
Figure 1 is a view showing the preferred embodiment of my invention in elevation and also showing diagrammatically the course of the air to and from the device.

My novel device may be formed of any material or plurality of materials consonant with its purpose, the material or materials that enter into the device not being of my invention.

Among other elements the device comprises a stand or body 1, preferably hollow for the sake of lightness, though I would have it understand that I do not confine myself to the employment of hollow stands. In addition to the stand or support 1, the device comprises an intake conduit 2, the said intake conduit having its mouth 3 corresponding in width to the base of the stand or support 1, which base is preferably of rectangular form. The stand or base 1 is tapered upwardly, and the conduit 2 is preferably inclined to the extent indicated, and is merged at its upper end into a chamber 3 in which during the operation of my novel device, there is a tendency to create a partial vacuum. The said chamber 3 is located in the upper portion of the stand or support 1 and is preferably gradually enlarged in transverse area upwardly, and is merged, in turn, into an eduction orifice, located at the top of the front of the stand or support 1.

Figure 2:
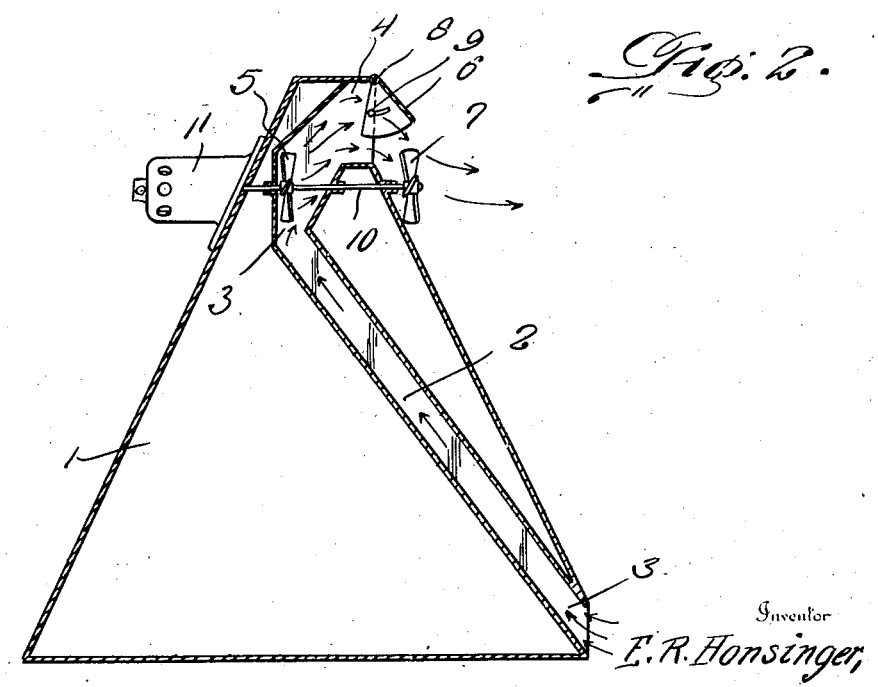
Figure 2 is an enlarged vertical section illustrating the preferred embodiment of my invention per se.

Located in the chamber 3 is a fan 5 of rotary type, the function of which is to expel air from the chamber 3 and force the same through the orifice 4, and by so doing to tend to create a partial vacuum in the chamber 3 with the result that air will be drawn through the conduit 2 to the said chamber 3. At 6 is a deflector the function of which is to direct the air emitted through the orifice 4 downwardly upon a rotary fan 7, which fan 7 is backed by the upper portion of the stand or support 1 as illustrated in Figures 1 and 2, and is designed to move the air under pressure toward the right in Figure 1 or away from the face of the stand or support 1. The deflector is preferably connected in pivotal manner as designated by 8 and at 9 is adjustably fixed, so that it may be positioned to direct the air to the best advantage to the blades of the fan 7.

Any appropriate means may be employed to rotate the fans 5 and 7 at a high rate of speed. I prefer, however, to fix the said fans on a common shaft 10, and I also prefer that the shaft 10 be the armature shaft of an electric motor 11. The said motor being fixed to the rear side of the stand or support 1, and the arrangement set forth being advantageous inasmuch as it lends itself to the simplicity, compactness and efficiency of the device as a whole.

It will be apparent from the foregoing that incident to the operation of my novel device, the circulation of air through an apartment or through a large enclosure such as an auditorium, will maintain the air in a cool, fresh and wholesome state.

I have specifically described the preferred construction of my invention in order to impart a full, clear and exact understanding of the said construction. I do not desire, however, to be understood as confining myself to the specific construction and relative arrangement of the parts as disclosed, my invention being defined by my appended claims within the scope of which modifications in structure and arrangement may be made without departure from my invention.

Having described my invention, what I claim and desire to secure by Letters Patent, is:—

1. An air circulating device comprising a stand, an inclined conduit in the stand and havng an induction orifice at its lower end, a chamber in the stand and into which the conduit is merged at its upper end, said chamber being gradually increased in size upwardly and being merged, in turn, into an eduction orifice disposed in the same general direction as the induction orifice of said conduit, and rotary fans mounted one in the said chamber and one in front of the stand and in a plane below that of the said eduction orifice.

2. Air circulation means including a chamber, said chamber having induction and eduction appurtenances, means in said chamber for creating a partial vacuum therein and thereby maintaining the circulation of air through said induction and eduction appurtenances, and means to which air passes from the eduction appurtenance, the last named means being adapted to force the air in a direction away from the circulation means, and being combined with means mounted above the eduction appurtenance for directing air to the said air forcing means.

In testimony whereof I affix my signature.

E. RICHMOND HONSINGER.